C. MARKSON.
TIRE.
APPLICATION FILED MAY 16, 1914.
1,136,546.
Patented Apr. 20, 1915.
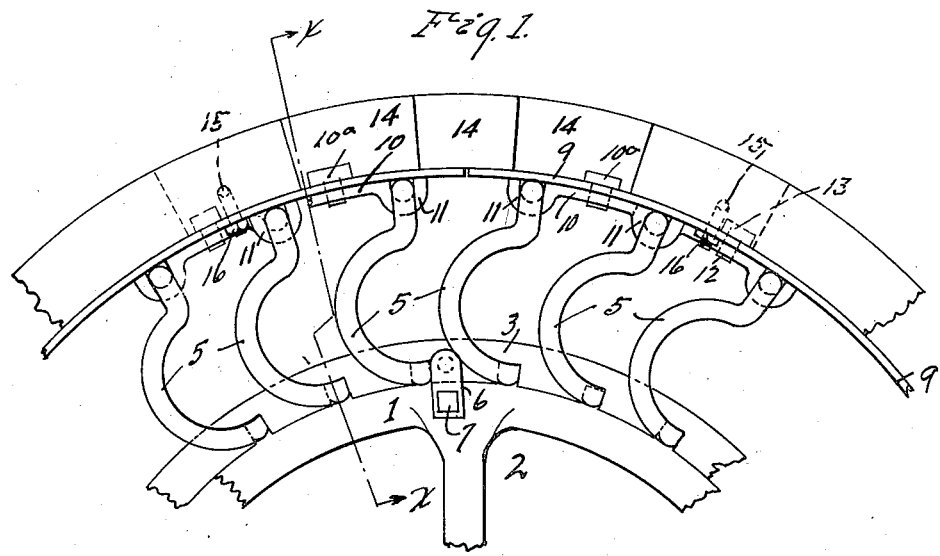
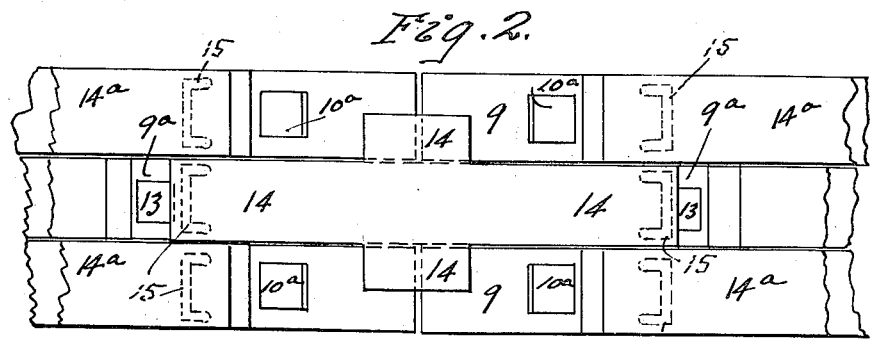
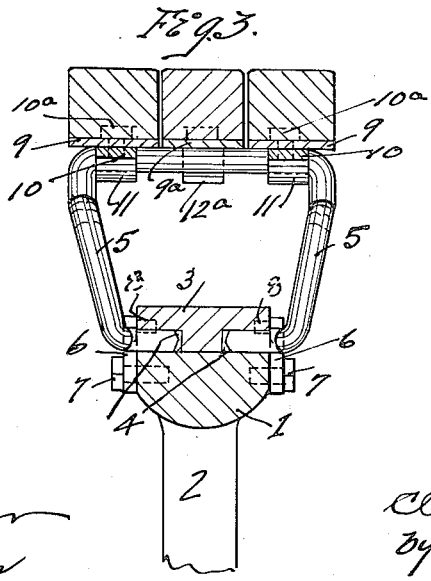
Witnesses:
Frank H. Fowler
Emma Kroger
Inventor
Clemens Markson,
By Fred P. Gorin.
Attorney

UNITED STATES PATENT OFFICE.

CLEMENS MARKSON, OF SEATTLE, WASHINGTON.

TIRE.

1,136,546.        Specification of Letters Patent.        Patented Apr. 20, 1915.

Application filed May 16, 1914. Serial No. 838,933.

*To all whom it may concern:*

Be it known that I, CLEMENS MARKSON, a citizen of the United States, and a resident of the city of Seattle, in King county and State of Washington, have invented certain new and useful Improvements in Tires, of which the following is a specification.

This invention relates to tires, and more especially to tires for power driven vehicles such as automobiles and the like, and has for its principal object to provide such a device in which the needed resiliency is combined with great durability.

The invention will be more fully hereinafter described and explained, illustrated in the accompanying drawings and pointed out in the appended claim.

In the drawings, Figure 1, is a fragmentary side elevation of a wheel equipped with my improved tire. Fig. 2 is a similar view in plan. Fig. 3 is a cross-sectional view of the same upon the line $x$—$x$ of Fig. 1.

Referring now more particularly to the drawings, reference numeral 1 designates the felly of a wheel: 2, one of the spokes of the wheel. Upon the outer circular surface of the said felly is fitted a band 3, in each side of which and spaced at suitable intervals are angular recesses 4 (see Fig. 3) into which enter the ends of the springs 5, the said band being firmly held to the felly by any approved means, such, for example, as the plate 6, which may be of any suitable number sufficient to hold the said band against movement with respect to the felly. Each of the said plates is apertured at one of its ends to receive the screw 7 which is screwed into the side of the felly, and the other end of the said plate has a stud 8 which enters the side of the band 3, as plainly seen in Fig. 3. The studs or vertical portions of the springs 5 may be of any desired shape in cross section, but the ends thereof, which enter between the felly and the band 3, are made angular so as to prevent the turning of the said ends within their recesses 4. Disposed around the felly, and in spaced relation thereto, are outer strips 9, which in this instance are of thin metal and preferably of suitable short segments, that is to say no single one of the said strips is of sufficient length to extend entirely around the felly and the strips 9 are staggered with respect to the strips $9^a$, as plainly seen in Fig. 2. The outer strips 9 are joined to the tops of the springs 5 by means of clips 10, each of whose ends is curved as indicated at 11, to fit over the tops of the said springs and the said clips are secured to the said strips by means of bolts $10^a$. The central strips $9^a$ are similarly joined to the said springs by the clips 12 whose ends are similarly curved as at $12^a$, and the said clips are secured to the said strips $9^a$ by means of bolts 13. To each of the central strips $9^a$ is secured a resilient tread 14, which is preferably of rubber and of the shape as plainly shown in Fig. 2. Similar treads $14^a$ are secured to the outer strips 9. These treads may be secured to the strips in any approved manner but in this instance I provide staples 15 which are embedded in the said treads and have their ends threaded to receive the nuts 16. The top portions of the springs 5 are circular in cross section so as to allow some slight movement of the same within the curved portions 11 and $12^a$ of their respective confining clips 10 and 12, but the bottom portions of the said springs, being square as indicated, obviously have no movement with respect to their confining band 3.

From the foregoing it is believed that the construction of my device will be clear to others, and the operation of the same is that the load of the vehicle to which the tires are applied causes the springs 5 to yield and that portion of the same which is in contact with the ground tends to flatten out and thus give the necessary traction and resiliency. The strips 9 and $9^a$ also act as springs but being staggered with respect to each other, as above explained, do not flatten out unduly upon contact with the ground as they, obviously, would do if they were not so staggered. Sections of worn treads may be easily removed and replaced by simply removing the particular strips to which such worn tread is attached and renewing the same, and the springs $5^a$ when broken may obviously be easily replaced.

While I have shown and described a particular form of embodiment of my invention, I am aware that many minor changes therein will readily suggest themselves to others skilled in the art without departing from the spirit and scope of the invention and I therefore desire to avoid being limited to the exact form shown and described except as pointed out in the appended claim.

What I claim as new and desire to protect by Letters Patent is:—

In a resilient vehicle tire, the combination of a plurality of looped springs which extend transversely of the tire and radially from the felly of the wheel, the said springs having squared ends, means for rigidly securing the squared ends of the springs to the felly whereby there is no movement between the said ends and the felly, the said means including a band secured to the felly and having squared recesses therein in spaced relation to each other and into which the squared ends of the springs tightly fit, a plurality of resilient tread strips arranged in staggered relation to each other around the felly, but in spaced relation to the felly and means for pivotally securing the tread portions of the springs to the said tread strips.

CLEMENS MARKSON.

Witnesses:
 FRED P. GORIN,
 R. D. SMALLEY.